United States Patent
Paradise (10) Patent No.: US 8,226,822 B2
(45) Date of Patent: Jul. 24, 2012

(54) COMBINED OIL FILTER AND DEBRIS MONITOR

(75) Inventor: Bruce Paradise, Avon, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 482 days.

(21) Appl. No.: 12/430,513

(22) Filed: Apr. 27, 2009

(65) Prior Publication Data

US 2010/0270242 A1  Oct. 28, 2010

(51) Int. Cl.
*B01D 35/00* (2006.01)
*B01J 49/00* (2006.01)
*B01D 21/26* (2006.01)

(52) U.S. Cl. ...... 210/85; 210/90; 210/96.1; 210/167.04; 210/304; 210/512.1; 210/741; 210/745; 210/787

(58) Field of Classification Search .................. None
See application file for complete search history.

(56) References Cited

U.S. PATENT DOCUMENTS

| | | | |
|---|---|---|---|
| 3,189,180 A | | 6/1965 | Scott et al. |
| 3,686,926 A | * | 8/1972 | Miller et al. ................. 73/61.72 |
| 3,972,816 A | | 8/1976 | Mail et al. |
| 4,199,443 A | * | 4/1980 | Tauber ........................... 210/85 |
| 4,997,556 A | * | 3/1991 | Yano et al. .................... 210/136 |
| 5,090,976 A | | 2/1992 | Dyson |
| 5,112,479 A | | 5/1992 | Srimongkolkul |
| 5,478,484 A | | 12/1995 | Michaluk |
| 5,492,622 A | | 2/1996 | Broussard |
| 6,210,575 B1 | | 4/2001 | Chase et al. |
| 6,231,649 B1 | | 5/2001 | Dyson et al. |

FOREIGN PATENT DOCUMENTS

WO  WO9823380  6/1998

\* cited by examiner

*Primary Examiner* — Krishnan S Menon
*Assistant Examiner* — Dirk Bass
(74) *Attorney, Agent, or Firm* — Kinney & Lange, P.A.

(57) ABSTRACT

A cyclone separator includes a wall, a first passage, a second passage, and an oil debris monitor. The wall defines a cyclone cavity. The first passage has a first passage inlet positioned in the cyclone cavity and a first passage outlet at an exterior of the cyclone separator. The second passage has a second passage inlet positioned in the cyclone cavity and a second passage outlet at the first passage. The oil debris monitor detects debris flowing through the second passage.

20 Claims, 7 Drawing Sheets

COMBINED OIL FILTER AND DEBRIS MONITOR

BACKGROUND

The present invention relates to fluid systems, and more particularly, to combination fluid monitoring and filtering systems.

In many gas turbine engines, a low pressure spool includes a low pressure turbine connected to and driving a low pressure compressor, and a high pressure spool includes a high pressure turbine connected to and driving a high pressure compressor. In some gas turbine engines, a fan at the front of the engine is connected to the low pressure spool through a fan drive gear system. A lubrication system is used to pump lubricating liquid to engine components that require lubrication, such as the fan drive gear system. These engine components typically have moving parts that can shed small debris particles, or particulates, to the lubricating liquid. A particulate monitor is often used to monitor the shed particulates. By monitoring particulates, maintenance personnel can gain valuable information about how components are wearing in the engine and can use that information to make maintenance decisions. A filter is often used to remove the particulates from the lubricating liquid before it is returned to lubricate the engine components. Particulate monitors and filters can be relatively bulky, taking up valuable space in a gas turbine engine.

SUMMARY

According to the present invention, an assembly includes a cyclone separator and a filter element. The cyclone separator has an annular cyclone body enclosing a cyclone cavity. The filter element has filter material positioned between inner and outer filter surfaces with filter passages fluidically connecting the inner filter surface to the outer filter surface. The inner filter surface defines a hollow core, and the outer filter surface is positioned radially outward from the inner filter surface. The cyclone separator is positioned inside the hollow core with the cyclone body spaced apart from the inner filter surface.

In another embodiment, a lubricating liquid filtration assembly includes an inside-out liquid filter element and a cyclone separator. The cyclone separator is positioned inside a hollow core of the inside-out liquid filter element. An annular flow passage spaces the cyclone separator from the inside-out liquid filter element.

In yet another embodiment, a cyclone separator includes a cyclone body, a first pipe, and a second pipe. The cyclone body has an annular wall defining a cyclone cavity and a collector wall defining a collector cavity. The first pipe is positioned inside and substantially coaxial with the annular wall, and the second pipe is positioned inside the first pipe. The first pipe has a first pipe inlet positioned in the cyclone cavity and a first pipe outlet extending to an exterior of the cyclone body. The second pipe has a second pipe inlet positioned in the collector cavity and a second pipe outlet extending to an exterior of the cyclone body.

In yet another embodiment, a cyclone separator includes an annular wall, a collector wall, a first passage, a second passage, and an ejector. The annular wall defines a cyclone cavity, and the collector wall defines a collector cavity fluidically connected to the cyclone cavity. The first passage fluidically connects the cyclone cavity to an exterior of the cyclone separator. The second passage fluidically connects the collector cavity to the first passage. The ejector is positioned in the first passage for siphoning fluid from the second passage into the first passage.

In yet another embodiment, a cyclone separator includes a wall, a first passage, a second passage, and an oil debris monitor. The wall defines a cyclone cavity. The first passage has a first passage inlet positioned in the cyclone cavity and a first passage outlet at an exterior of the cyclone separator. The second passage has a second passage inlet positioned in the cyclone cavity and a second passage outlet at the first passage. The oil debris monitor detects debris flowing through the second passage.

Still another embodiment includes a method for monitoring particulates in fluid. The method includes the steps of flowing fluid into a cyclone separator, separating the fluid with the cyclone separator into a low particulate flow and a high particulate flow, monitoring particulates in the high particulate flow, and recombining the low particulate flow with the high particulate flow.

DETAILED DESCRIPTION

Figure 1:
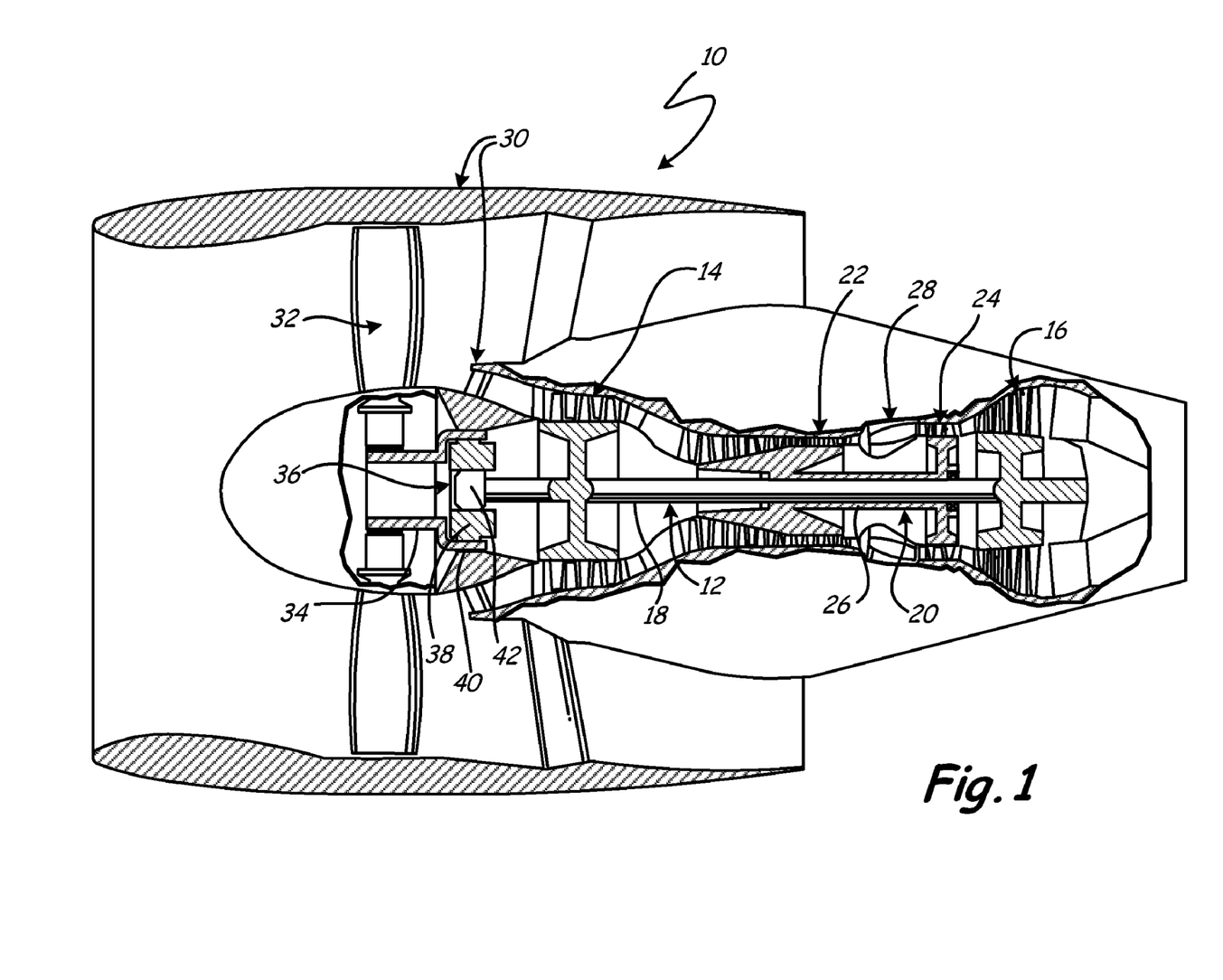
FIG. 1 is a schematic cross-sectional side view of a gas turbine engine.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). Low pressure spool 12 is coupled to fan shaft 34 via fan drive gear system 36. Various components in gas turbine engine 10, such as fan drive gear system 36, benefit from lubrication.

Figure 2:
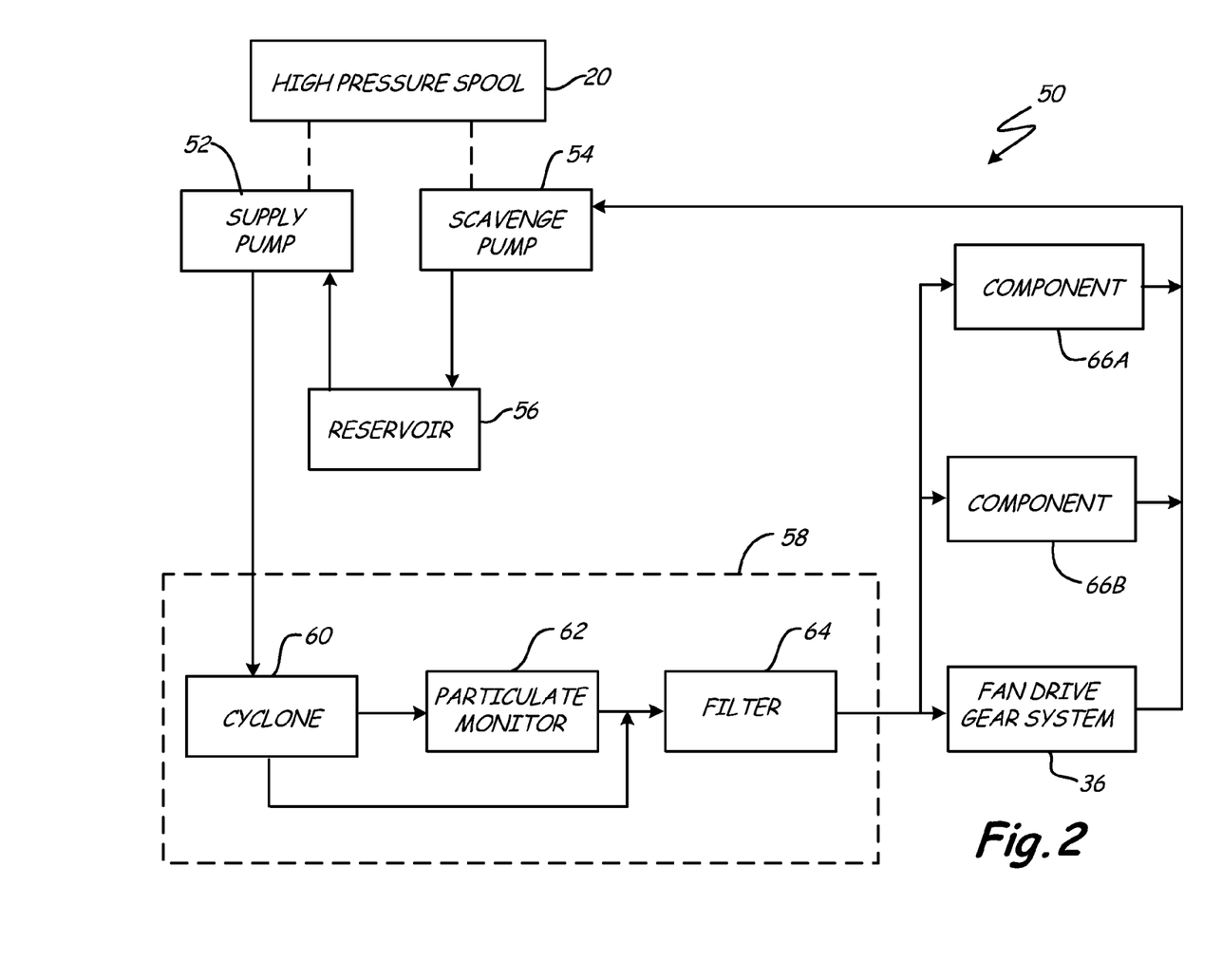
FIG. 2 is a schematic view of a lubrication system of the present invention for use in the gas turbine engine of FIG. 1.

FIG. 2 is a schematic diagram of lubrication system 50 for use in gas turbine engine 10. Lubrication system 50 includes supply pump 52 and scavenge pump 54 connected through gearing, and driven by, high pressure spool 20. Supply pump 52 pumps fluid, such as a lubricating oil, from reservoir 56 to combined particulate monitor and filter assembly (hereinafter "filter assembly") 58. Filter assembly 58 includes cyclone separator (hereinafter "cyclone") 60, particulate monitor 62, and filter 64. Cyclone 60 separates the fluid into a high particulate flow and a low particulate flow. The high particulate flow is then directed to particulate monitor 62 for measuring particulates in the fluid. The high particulate flow and low particulate flow are then recombined and flown through filter 64 to remove the particulates. The structure of filter assembly 58 is further described below with respect to FIG. 3. The operation of filter assembly 58 is further described below with respect to FIGS. 4A-4D. After filter assembly 58 monitors and filters the fluid, it is supplied to fan drive gear system 36 and other various engine components 66A and 66B that use the fluid. Scavenge pump 54 returns the used fluid to reservoir 56 for the process to be repeated.

Figure 3:
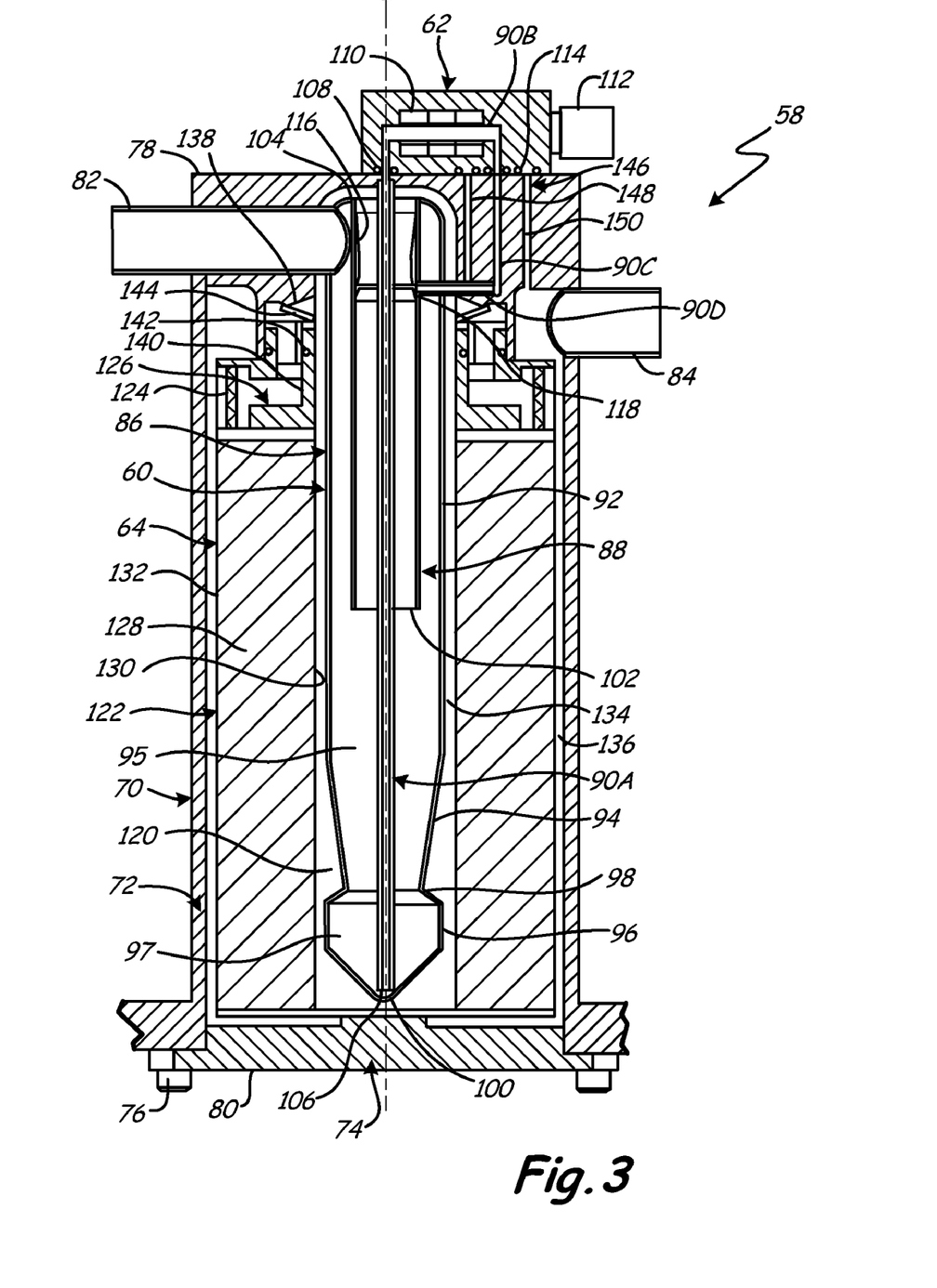
FIG. 3 is a cross-sectional elevation view of a combined particulate monitor and filter assembly used in the lubrication system of FIG. 2.

FIG. 3 is a cross-sectional elevation view of filter assembly 58 with housing 70 including top portion 72 and bottom cap 74 connected by bolts 76. Filter assembly 58 is oriented vertically with assembly top 78 above assembly bottom 80. Particulate monitor 62 is attached to top portion 72 at assembly top 78. Filter 64 and cyclone 60 are positioned inside housing 70. Fluid flows into filter assembly 58 through inlet pipe 82 and out of filter assembly 58 through outlet pipe 84.

Inlet pipe 82 is fluidically connected to cyclone 60. Cyclone 60 includes cyclone body 86, stand pipe 88, and siphon pipe 90A, all of which can be substantially annular structures, aligned substantially coaxially and symmetrically about centerline axis $C_L$. Siphon pipe 90A is positioned inside stand pipe 88, which is positioned inside cyclone body 86. Cyclone body 86 includes cylindrical wall 92 adjacent to frusto-conical wall 94, together defining cyclone cavity 95. Cyclone body 86 further includes collector wall 96 defining collector cavity 97. Collector wall 96 is connected to frusto-conical wall 94 at isolation lip 98 and converges at a bottom of cyclone 60 at tip 100. Stand pipe 88 has stand pipe inlet 102 positioned in cyclone cavity 95 and stand pipe outlet 104 extending to the exterior of cyclone body 86. Siphon pipe 90A has siphon pipe inlet 106 positioned in collector cavity 97 near tip 100 and siphon pipe outlet 108 extending to an exterior of cyclone body 86.

Siphon pipe outlet 108 of siphon pipe 90A fluidically connects to an inlet end of siphon pipe 90B in particulate monitor 62. In the illustrated embodiment, particulate monitor 62 is an oil debris monitor. Three loops of particulate sensing coils 110 wrap around an outer diameter of siphon pipe 90B. Particulate sensing coils 110 can electrically connect to particulate monitor circuitry (not shown) which can electrically connect to an aircraft cockpit control panel (not shown) via electrical connector 112. An outlet end of siphon pipe 90B fluidically connects to an inlet end of siphon pipe 90C in top portion 72. O-rings 114 are positioned between particulate monitor 62 and top portion 72 to reduce fluid leakage. Siphon pipe 90C is a passage bored through top portion 72. Siphon pipe 90D fluidically connects an outlet end of siphon pipe 90C to stand pipe 88. Stand pipe 88 includes ejector 116 (also called an eductor) positioned near stand pipe outlet 104. Siphon pipe 90D is connected to stand pipe 88 at an inlet portion 118 of ejector 116. Together, siphon pipes 90A-90D extend from collector cavity 97 of cyclone 60 through particulate monitor 62 and back to stand pipe 88 of cyclone 60.

Cyclone 60 is positioned inside hollow core 120 of filter 64. Filter 64 includes main filter element 122, bypass filter element 124, and bypass passage 126. Main filter element 122 has filter material 128 with porous passages positioned between porous inner filter surface 130 and porous outer filter surface 132. Main filter element 122 is a substantially cylindrical, inside-out oil filter such that inner filter surface 130 is, effectively, a filter inlet and outer filter surface 132 is, effectively, a filter outlet spaced radially outward from inner filter surface 130. Inner filter surface 130 defines hollow core 120. Inner filter surface 130 is spaced from an outer surface of cyclone body 86 so that hollow core 120 forms inner annular flow passage 134, while outer filter surface 132 is spaced from an inner surface of top portion 72 to form outer annular flow passage 136. In one embodiment, main filter element 122 can be a pleated filter with relatively fine pores.

Bypass passage 126 fluidically connects inner annular flow passage 134 to outer annular flow passage 136. Bypass passage 126 includes first portion 138 formed as part of top portion 72 and second portion 140 formed as part of filter 64. Multiple o-rings 142 are positioned between first portion 138 and second portion 140 to reduce fluid leakage. Bypass valve 144 is a pressure valve for selectively opening bypass passage 126. In the illustrated embodiment, bypass valve 144 is a spring washer relief valve. In an alternative embodiment, bypass valve 144 can be a poppet check type relief valve. By dividing bypass passage 126 into first and second portions 138 and 140, bypass valve 144 can be attached to housing 70, not to filter 64. Thus, bypass valve 144 need not be replaced and retested with every replacement of filter 64.

Filter assembly 58 can include differential pressure sensor 146 having sensor passages 148 and 150 extending from particulate monitor 62 to inner annular flow passage 134 and outer annular flow passage 136, respectively. Differential pressure sensor 146 can include pressure sensing circuitry (not shown) positioned in particulate monitor 62. A main pressure sensor (not shown) can also have a flow passage (not shown) extending from main pressure circuitry in particulate monitor 62 to outer annular flow passage 136. Thus, particulate monitor 62 can include circuitry for three different sensors. Particulate monitor 62 can be a bolt-on line replaceable unit (LRU).

Figure 4A:
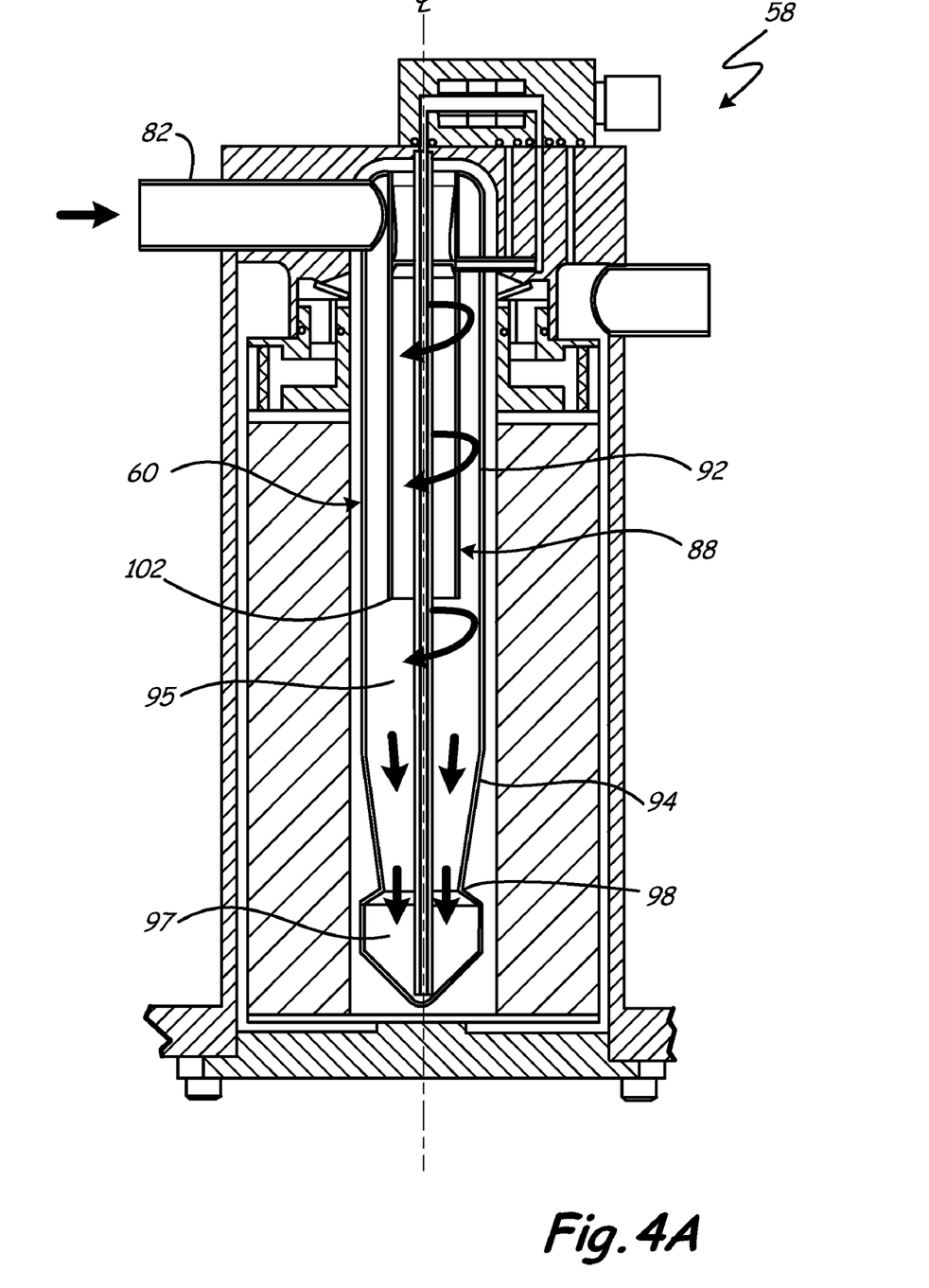
FIG. 4A is a first view of the filter assembly of FIG. 3, showing fluid flow.

FIG. 4A is a first view of filter assembly 58, showing fluid flow. Fluid enters into cyclone 60 through inlet pipe 82. Inlet pipe 82 is connected to cylindrical wall 92 askew of centerline axis $C_L$ so as to supply fluid into cyclone 60, tangential to an interior surface of cylindrical wall 92. Fluid flows in a spinning manner, like a cyclone, between cylindrical wall 92 and stand pipe 88. Particulates, especially metal particulates commonly found in lubricating oil in gas turbine engines, typically have a greater specific gravity than lubricating oil. As the fluid spins, the particulates in the fluid are centrifugally spun out toward cylindrical wall 92 under high acceleration forces. The particulates are then driven down, out of cyclone cavity 95, over isolation lip 98, and into collector cavity 97. Particulates decelerate as they pass over isolation lip 98 and spin out toward collector wall 96. When filter assembly 58 is oriented vertically as illustrated, gravity assists in collecting particulates in collector cavity 97. Thus, collector cavity 97 contains a high particulate flow (also called particulate laden oil), having a relatively high concentration of particulates, while cyclone cavity 95 contains a low particulate flow, having a relatively low concentration of particulates. Since heavy particulates are accelerated to cylindrical wall 92 and frusto-conical wall 94, cyclone cavity 95 has an especially low concentration of particulates in its center, where fluid can be substantially particulate free. The length of stand pipe 88 allows the particulates time to spin out of the center of cyclone cavity 95, before the low particulate fluid enters stand pipe inlet 102.

Figure 4B:
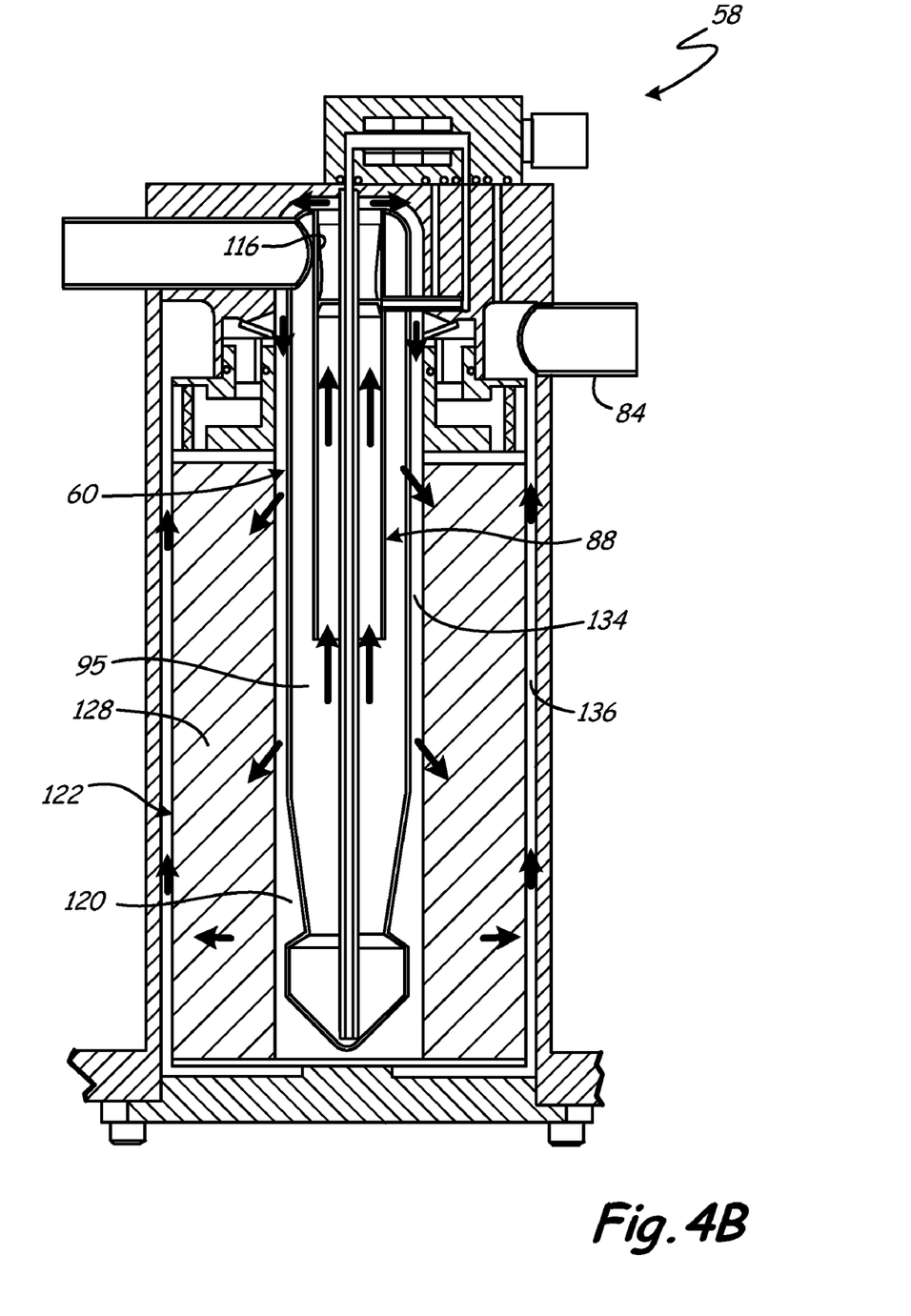
FIG. 4B is a second view of the filter assembly of FIG. 3, showing fluid flow.

FIG. 4B is a second view of filter assembly 58, showing fluid flow. Low particulate fluid in the center of cyclone cavity 95 is forced up stand pipe 88, over ejector 116, and out of cyclone 60 into inner annular flow passage 134 and hollow core 120. The fluid then flows from hollow core 120 through main filter element 122 to outer annular flow passage 136 and then out outlet pipe 84. Main filter element 122 collects the particulates in its porous filter material 128 to clean the fluid. After flowing through main filter element 122, the fluid is now in condition for lubricating fan drive gear system 36 and other components 66A and 66B (shown in FIG. 2).

Figure 4C:
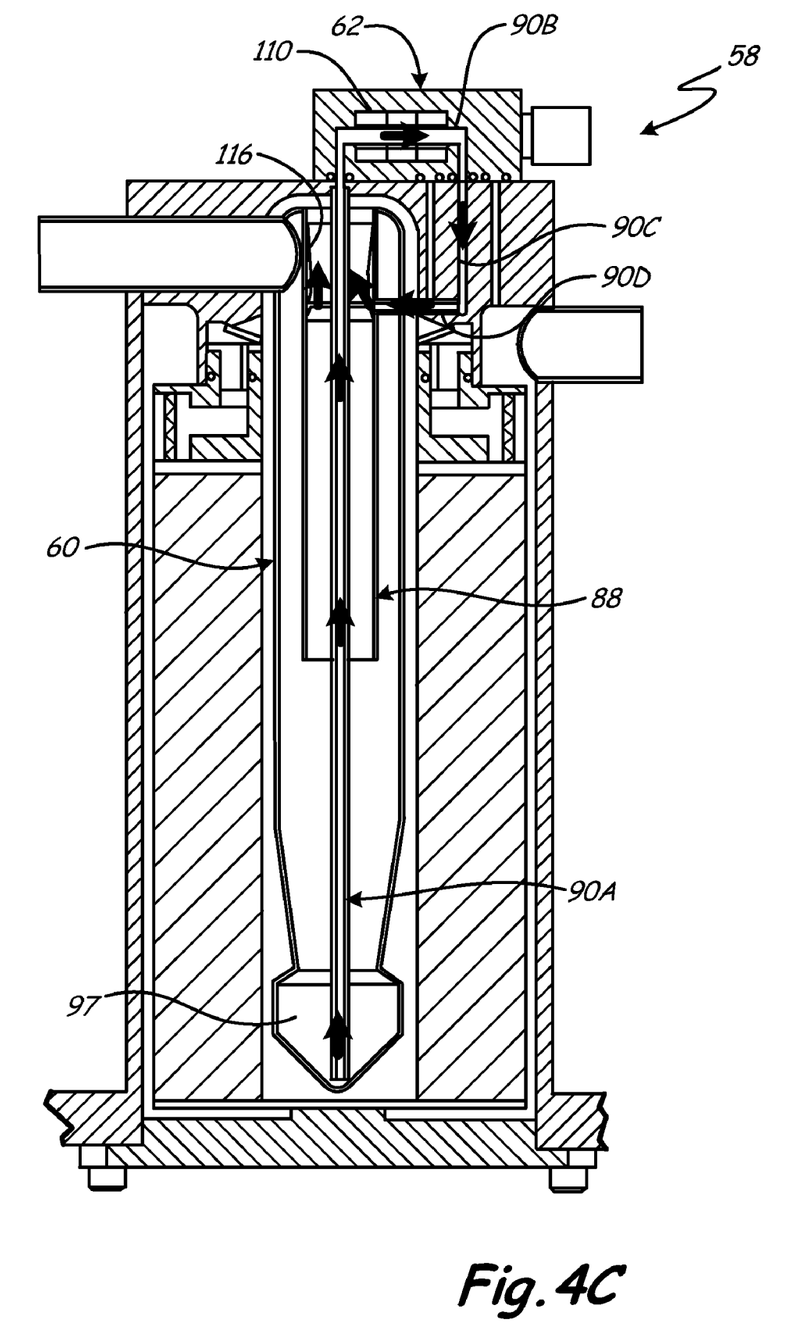
FIG. 4C is a third view of the filter assembly of FIG. 3, showing fluid flow.

FIG. 4C is a third view of filter assembly 58, showing fluid flow. Flowing low particulate fluid over ejector 116 acts as a motive flow, creating a low pressure zone at ejector 116. The low pressure zone creates a suction force in siphon pipe 90D, since it is fluidically connected at ejector 116. The suction force causes high particulate fluid in collector cavity 97 to be siphoned up through each of siphon pipes 90A-90D. The high particulate flow is monitored by particulate monitor 62 and then passed back to cyclone 60 where it is mixed with the low particulate flow in stand pipe 88 prior to filtering.

Cyclone 60 can separate particulates in fluid relatively efficiently. Common cyclone separators on the market have been tested at about 90% efficiency for even low density particulates, having a specific gravity of about 1.7 and a diameter of about 74 microns. Efficiency for high density particulates, such as aluminum (2.7 specific gravity) and lead (11.3 specific gravity), can be even better. Gas turbine engine 10 (shown in FIG. 1) can benefit from separation and detection of particulates of about 200 microns and larger. Cyclone 60 can effectively separate a significant portion of such particulates.

Because cyclone 60 is so efficient, siphon pipes 90A-90D can have a relatively narrow diameter while still carrying enough high particulate fluid. Particulate monitor 62 benefits from siphon pipe 90B having a relatively small diameter. Sensing coils 110 sense can accurately sense smaller particulates by being wrapped around narrow pipes. Thus, the high efficiency of cyclone 60 allows particulate monitor 62 to be more efficient as well. In the illustrated embodiment, siphon pipe 90B has a diameter of about 0.15 inches (about 0.381 centimeters). Particulate monitor 62 can determine whether particulates are ferrous or non-ferrous, as well as how big the particulates are. A suitable particulate monitor 62 for certain applications can be obtained from the MetalSCAN product line, manufactured by GasTOPS Inc. of Pensacola Fla.

Figure 4D:
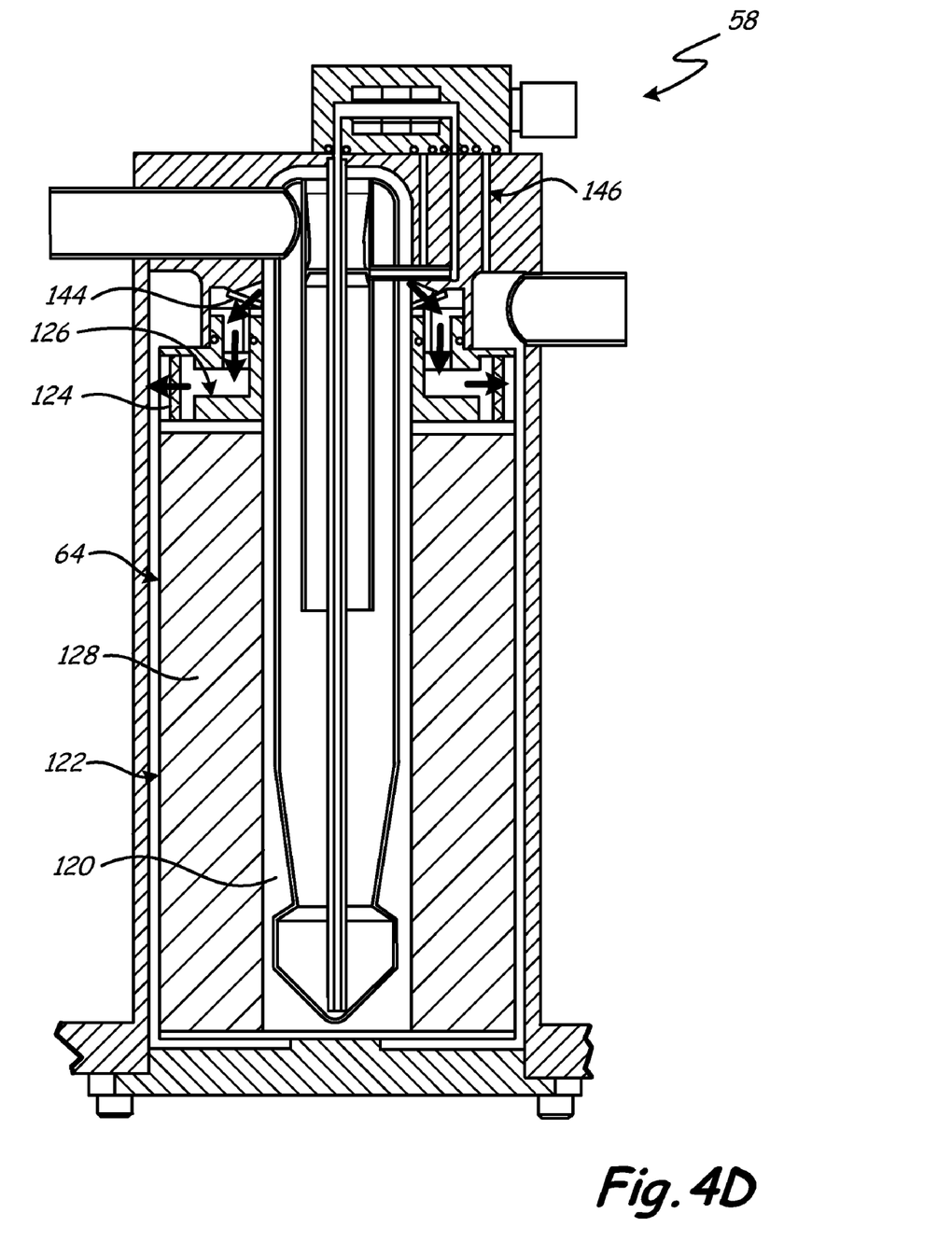
FIG. 4D is a fourth view of the filter assembly of FIG. 3, showing fluid flow.

FIG. 4D is a fourth view of filter assembly 58, showing fluid flow. If main filter element 122 collects a relatively large amount of particulates over time, filter material 128 can become clogged. In such a case, fluid flow through main filter element 122 will be reduced and pressure in hollow core 120 will be increased. If pressure in hollow core 120 exceeds a threshold, bypass valve 144 is forced open allowing fluid to flow through bypass passage 126. This flow bypasses main filter element 122, and instead passes through bypass filter element 124. Bypass filter element 124 can be a coarse filter, suitable for filtering large particles but not particulates as small as those filterable by the fine pores of main filter element 122.

Differential pressure sensor 146 measures pressure drop across filter 64. If the measured pressure drop exceeds a first value, differential pressure sensor 146 can send a first signal to the aircraft cockpit control panel (not shown), indicating that main filter element 122 is becoming clogged. If the measured pressure drop exceeds a second value, differential pressure sensor 146 can send a second signal indicating that main filter element 122 has become so clogged that bypass valve 144 has opened. Maintenance personnel can then replace filter 64 at the next opportunity or take other maintenance action, as appropriate.

It will be recognized that the present invention provides numerous benefits and advantages. For example, filter assembly 58 can monitor and filter fluids in a relatively compact housing. In one embodiment, filter assembly 58 can be about 5 inches (about 12.7 centimeters) in diameter and about 10 inches (about 25.4 centimeters) in height. This small space requirement can be beneficial in applications where space is a premium, such as in gas turbine engine 10. Space is further saved by reducing the amount of external plumbing, support brackets, and electrical connections needed. For example, by merging particulate monitor 62, differential pressure sensor 146, and a main pressure sensor (not shown) into one device, electrical connections can be performed with only a single electrical connector and a single harness routing. This reduction in part count not only saves space, but also reduces weight. Additionally, cyclone 60 can have better separation efficiency, and particulate monitor 62 can have better detection efficiency that other particulate monitors. This allows for better diagnostic of engine conditions by maintenance personnel, which can be particularly useful on oil sensitive equipment such as fan drive gear system 36.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, filter assembly 58 need not be limited exclusively for use with lubricating oil in a gas turbine engine. Instead, filter assembly 58 can be use with other fluids under sufficient pressure to adequately operate cyclone 60.

The invention claimed is:

1. A method for monitoring particulates in fluid, the method comprising:
    flowing fluid into a cyclone separator;
    separating the fluid with the cyclone separator into a low particulate flow and a high particulate flow;
    flowing the high particulate flow through a pipe to a particulate monitor that monitors the particulates in the high particulate flow;
    recombining the low particulate flow with the high particulate flow, wherein the high particulate flow includes the monitored particulates when recombined with the low particulate flow; and
    filtering the fluid and monitored particulates via a filter after monitoring particulates.

2. The method of claim 1, wherein the high particulate flow contains significantly more particulates having a diameter of about 200 microns and larger than the low particulate flow contains.

3. The method of claim 1, wherein the filter has a hollow core, and wherein fluid flows from the hollow core through the filter to an exterior of the filter.

4. The method of claim 1, wherein the filter is a main filter and further comprising:
    flowing the fluid through a filter bypass valve to a bypass filter positioned in a passage that bypasses the main filter if fluid pressure upstream of the main filter exceeds a threshold.

5. The method of claim 1, and further comprising:
    filtering the monitored particulates from the fluid after recombining the low particulate flow with the high particulate flow.

6. The method of claim 1, and further comprising:
    flowing the fluid to components in a gas turbine engine after filtering.

7. The method of claim 1, wherein monitoring particulates includes sensing particulates smaller than about 200 microns.

8. The method of claim 1, and further comprising:
    sensing a pressure differential between fluid upstream of the filter and fluid downstream of the filter.

9. The method of claim 1, wherein the pipe is a siphon pipe.

10. The method of claim 9, wherein the particulate monitor has electrical coils wrapped around an outer diameter of the siphon pipe.

11. The method of claim 1, wherein the cyclone separator has an annular cyclone body, wherein the filter has an inner filter surface defining a hollow core, and wherein the cyclone separator is positioned inside the hollow core with the cyclone body spaced apart from the inner filter surface.

12. The method of claim 1, wherein the cyclone separator is position inside a hollow core of an inside-out liquid filter element and is spaced apart from the inside-out liquid filter element by an annular flow passage.

13. The method of claim 12, and further comprising:
flowing the fluid through the annular flow passage after recombining the low particulate flow with the high particulate flow.

14. The method of claim 1, and further comprising:
flowing the high particulate flow out of the cyclone separator prior to monitoring particulates.

15. The method of claim 1, wherein the pipe comprises a second pipe and further comprising:
flowing the low particulate flow through a first pipe.

16. The method of claim 15, wherein the second pipe is positioned inside and is substantially coaxial with the first pipe.

17. The method of claim 1, wherein the pipe is part of a second passage and further comprising:
flowing the low particulate flow through a first passage; and
siphoning fluid from the second passage into the first passage via an ejector.

18. The method of claim 17, wherein the ejector is positioned in a portion of the first passage inside the cyclone cavity.

19. The method of claim 17, wherein the first passage has a first passage inlet positioned in the cyclone separator and a first passage outlet at an exterior of the cyclone separator and wherein the second passage has a second passage inlet positioned in the cyclone separator and a second passage outlet at the first passage.

20. The method of claim 19, wherein the cyclone separator has a cyclone top and a cyclone bottom and wherein the second passage inlet is positioned between the cyclone bottom and the first passage inlet.

* * * * *